US012776005B2

(12) United States Patent
Nanjegowd et al.

(10) Patent No.: US 12,776,005 B2
(45) Date of Patent: Oct. 27, 2026

(54) DEVICE FOR REPLACING INTRUSIVE OBJECT IN IMAGES

(71) Applicant: Microsoft Technology Licensing, LLC, Redmond, WA (US)

(72) Inventors: Chandrasekhar Nanjegowd, Hyderabad (IN); Rajesh Yadav, Hyderabad (IN); Naveen Kumar Yadav, Hyderabad (IN); Dimple Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 18/899,788

(22) Filed: Sep. 27, 2024

(65) Prior Publication Data

US 2025/0022105 A1 Jan. 16, 2025

Related U.S. Application Data

(63) Continuation of application No. 17/653,444, filed on Mar. 3, 2022, now Pat. No. 12,125,169.

(51) Int. Cl.

*G06K 9/00* (2022.01)
*G06T 5/50* (2006.01)

(Continued)

(52) U.S. Cl.

CPC .................. *G06T 5/50* (2013.01); *G06T 7/55* (2017.01); *G06V 10/25* (2022.01); *G06V 10/26* (2022.01);

(Continued)

(58) Field of Classification Search

CPC ... G06T 5/50; G06T 7/55; G06T 2207/20221; G06T 2207/20224; G06V 10/25; G06V 10/26

See application file for complete search history.

(56) References Cited

U.S. PATENT DOCUMENTS 11,100,664 B2 8/2021 Wantland et al.
2017/0345181 A1* 11/2017 Yu .............................. G06T 7/70

(Continued)

FOREIGN PATENT DOCUMENTS

CN 105827952 A 8/2016

OTHER PUBLICATIONS

First Examination Report Received for Indian Patent Application No. 202447066521, mailed on Aug. 18, 2026, 10 pages.

*Primary Examiner* — Avinash Yentrapati
(74) *Attorney, Agent, or Firm* — Alleman Hall LLP

(57) ABSTRACT

A computing device is provided. The computing device may include a first camera configured to capture a primary image sequence of a scene, and a second camera configured to substantially concurrently capture a secondary image sequence of the scene. The computing device may include a processor configured to execute instructions stored in memory to obtain a depth map for an image of the primary image sequence, and based on the depth map, generate a reference frame of background pixels from the primary image sequence. The processor may be configured to execute the instructions to detect an intrusive object in the secondary image sequence, replace the intrusive object in the primary image sequence with corresponding background pixels of the reference frame to generate a modified primary image sequence, and output on a display at least one image of the modified primary image sequence.

20 Claims, 8 Drawing Sheets

(51) Int. Cl.
*G06T 7/55* (2017.01)
*G06V 10/25* (2022.01)
*G06V 10/26* (2022.01)

(52) U.S. Cl.
CPC ............... *G06T 2207/20221* (2013.01); *G06T 2207/20224* (2013.01)

(56) References Cited

U.S. PATENT DOCUMENTS

| | | | | |
|---|---|---|---|---|
| 2018/0227489 | A1* | 8/2018 | Ho | H04N 23/611 |
| 2021/0042950 | A1* | 2/2021 | Wantland | G06T 5/77 |
| 2021/0374904 | A1 | 12/2021 | Liao | |
| 2022/0058777 | A1 | 2/2022 | Cohen | |

* cited by examiner

DEVICE FOR REPLACING INTRUSIVE OBJECT IN IMAGES

CROSS REFERENCE TO RELATED APPLICATIONS

This application is a continuation of U.S. patent application Ser. No. 17/653,444, filed Mar. 3, 2022, the entirety of which is hereby incorporated herein by reference for all purposes.

BACKGROUND

Camera users generally enjoy capturing beautiful moments of their family members, friends, and known acquaintances. Devices for taking pictures or recording video, such as a smartphone, tablet, or digital camera device, often have a viewfinder or display screen for the user to preview what the final picture or video will look like. The user is able to adjust various features such as zoom level and orientation before final capture, and may be able to edit the picture or video after final capture as well. However, during video recording, video calls, live streaming, and image capturing, there is often a high chance that an unexpected person or object might enter into the field of view and end up in the final captured or recorded in the video. The user may be looking directly at the viewfinder and not notice until it is too late that their intended picture has been spoiled. In real time, the user has little choice but to stop capturing or attempt to control the external environment by issuing verbal commands, etc., to those in the field of view when other people are moving around in the scene. Frustration can result in such situations.

SUMMARY

To address the issues discussed herein, a computing device is provided. The computing device may include a first camera configured to capture a primary image sequence of a scene, and a second camera configured to substantially concurrently capture a secondary image sequence of the scene. The computing device may include a processor configured to execute instructions stored in memory to obtain a depth map for an image of the primary image sequence, and based on the depth map, generate a reference frame of background pixels from the primary image sequence. The processor may be configured to execute the instructions to detect an intrusive object in the secondary image sequence, replace the intrusive object in the primary image sequence with corresponding background pixels of the reference frame to generate a modified primary image sequence, and output on a display at least one image of the modified primary image sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An undesired object such as an unknown person, a known person that does not belong in the scene based on context, or a non-human animal (e.g., pet) can intrude on the scene mid-capture of a video or before final capture of a still image. If the user is not able to control the scene manually, for example, when in a busy, public location such as a tourist attraction that is full of strangers blocking the desired shot, then the user may be able to edit the captured images in post-processing and remove unwanted people and objects from the captured images. However, recovering usable background pixel data is challenging, and in some cases impossible. Furthermore, the user will not know the quality of the final image or even if the image will be usable in the end, because the post-processing is not performed in real time.

Figure 1:
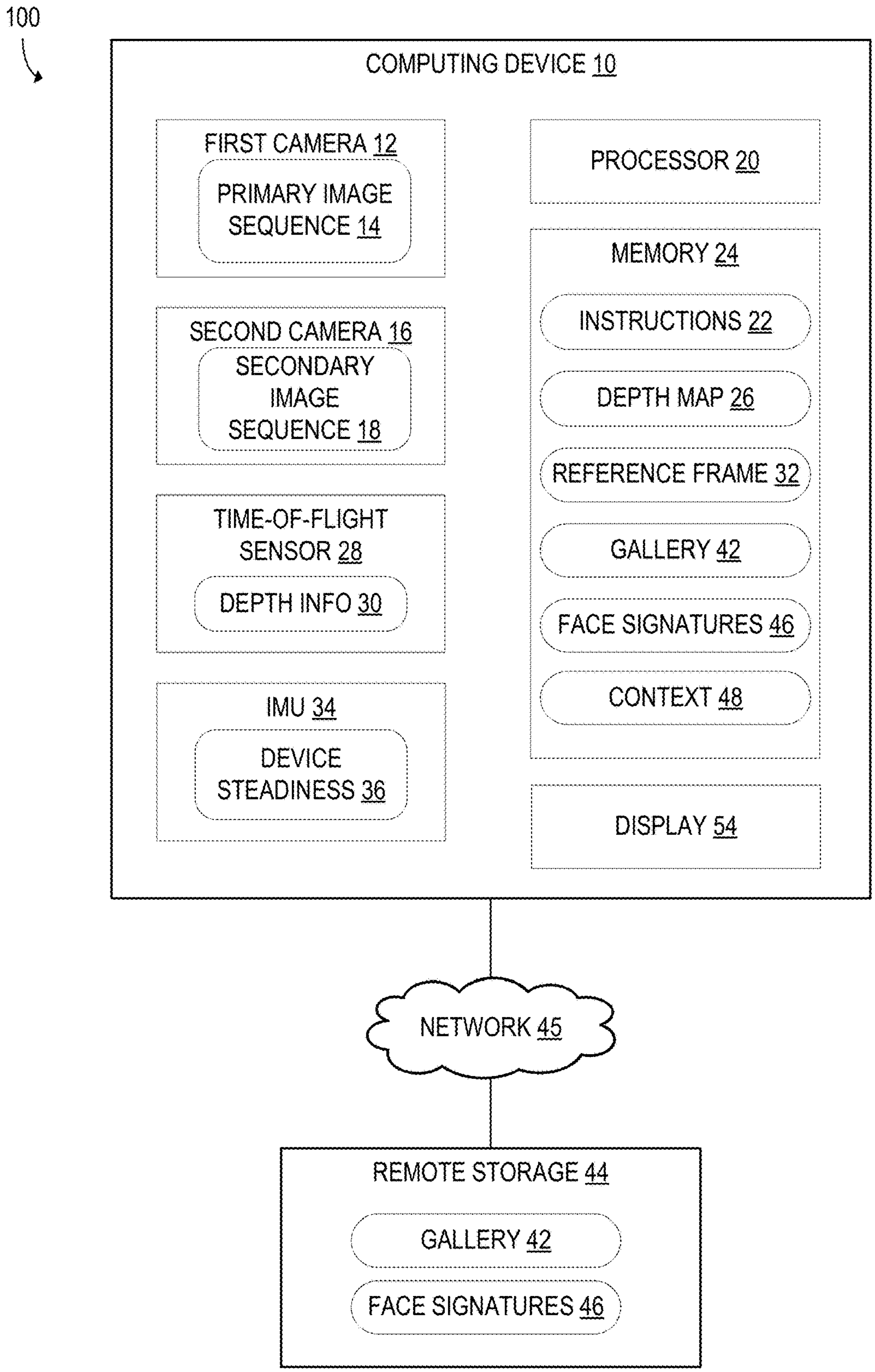
FIG. 1 shows a schematic view of an example computing system including a computing device according to one embodiment of the present disclosure.

As illustrated in FIG. 1, to address the above identified issues, a computing system 100 is provided. The computing system 100 includes a computing device 10. The computing device 10 may include a first camera 12 configured to capture a primary image sequence 14 of a scene. The primary image sequence 14 may be the main image sequence that is intended to be captured by a user of the computing device 10, although as will be described below, the primary image sequence 14 can be modified in real time. The computing device 10 may include a second camera 16 configured to substantially concurrently capture a secondary image sequence 18 of the scene. The first and second cameras 12, 16 therefore may capture the same scene from slightly different perspectives, since the cameras 12, 16 are not arranged at exactly the same physical location. The first camera 12 may have a higher resolution than the second camera 16, so that the final output of the computing device 10 is a high-quality image or video, but the secondary image sequence 18 is usable for processing at a lower resolution without creating an extra burden on storage, processing power, or data transmission. Alternatively, each camera 12, 16 may have the same resolution.

Figure 2:
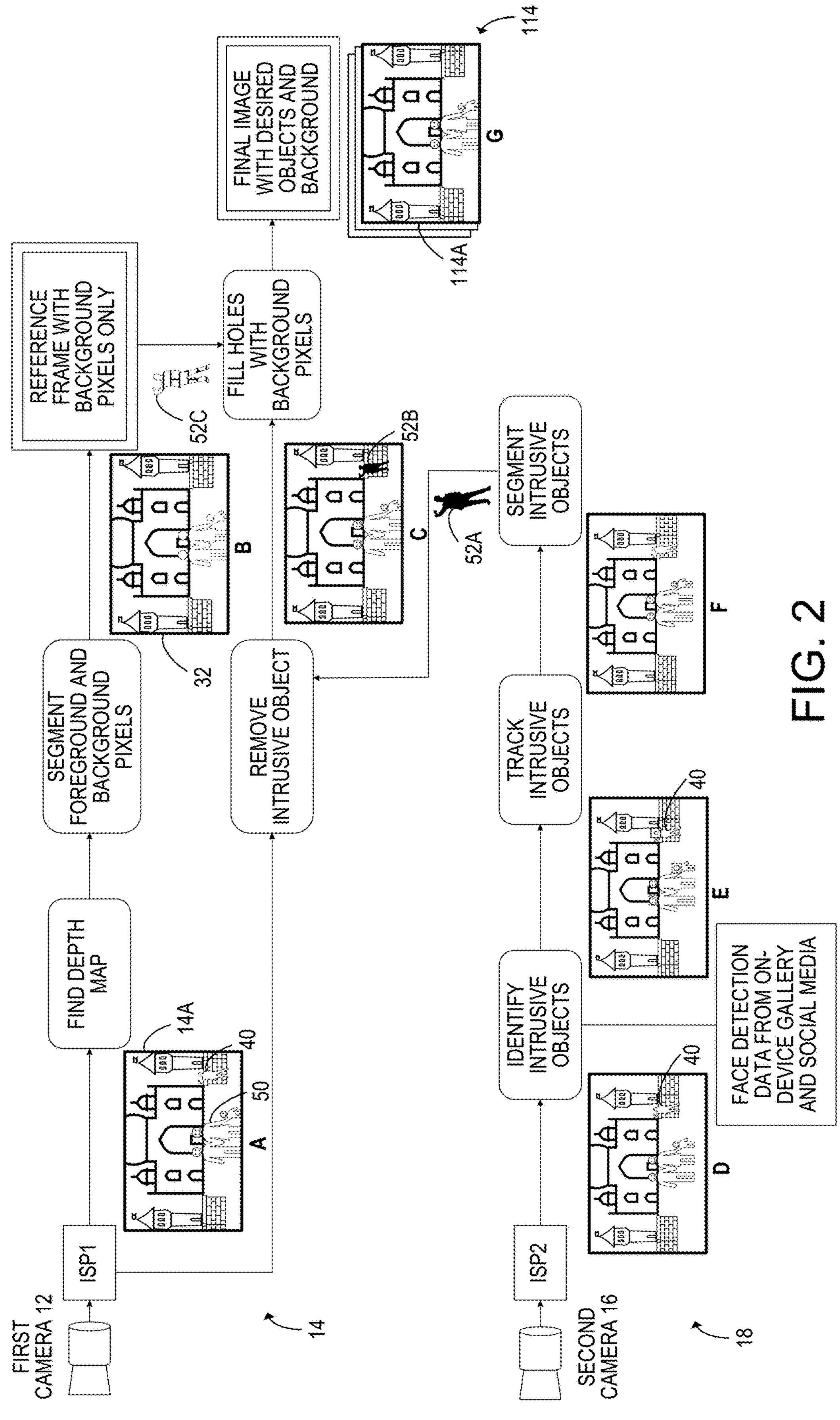
FIG. 2 shows an example process for removing an intrusive object when capturing an image with the computing device of FIG. 1.

The computing device may include a processor 20 configured to execute instructions 22 stored in memory 24 to perform various tasks, including an example process for removing an intrusive object when capturing an image, which is illustrated in FIG. 2. Items A-G of FIG. 2 are enlarged in FIGS. 8A-G, respectively. It will be appreciated that a video, being a sequence of images, may be processed in the same way as a single image, by processing each of the images (frames) in the sequence. As shown in the example of FIG. 2, after the primary image sequence 14 is produced in a first image signal processing module ISP1 of the processor 20 at A, the processor 20 may be configured to obtain a depth map 26 for an image 14A of the primary image sequence 14. For example, the processor 20 may be configured to generate the depth map 26 using a difference in perspective of the first and second cameras 12, 16, a time-of-flight sensor 28, or monocular depth estimation using a neural network to estimate the depth using only the first camera 12. The depth map 26 may be an indication of the depth from the computing device 10 (for example, from depth information 30 from the time-of-flight sensor 28 or the first camera 12) to a surface reflecting light back to be imaged (captured) in each pixel in the frame. The depth map 26 may therefore be used to determine whether each pixel is considered to be in the background or foreground. The depth map 26 may be stored in a buffer in the memory 24 and updated as the scene changes or the first camera 12 is pointed in a different direction. Alternatively, multiple depth maps may be stored corresponding to specific images of the primary image sequence 14.

Accordingly, the processor 20 may be configured to segment the background from the foreground based on the depth map 26 at B, and thereby generate a reference frame 32 of background pixels from the primary image sequence 14. The reference frame 32 may include pixels from more than one captured frame in the primary image sequence 14 as objects move around in the scene, or as the computing device 10 moves, revealing new portions of background over time. The reference frame 32 may be held in a buffer in the memory 24 and updated when circumstances change, such as when more background is revealed, the computing device 10 attitude changes, or the first camera 12 of the computing device 10 is directed at a new scene. In order to ensure that the reference frame 32 sufficiently corresponds to the currently captured image, the computing device may include an inertial measurement unit (IMU) 34, configured to sense the device steadiness 36 of the computing device 10. If the computing device is not steady enough, then the object removal process may be turned off, or the user may be instructed to hold the device steady, for example.

Meanwhile, after the secondary image sequence 18 is produced in a second image signal processing module ISP2 of the processor at D, the processor 20 may be configured to detect an intrusive object 40 in the secondary image sequence 18 at E. The intrusive object 40 is illustrated in FIG. 2 as a person taking a selfie in the background behind a family of three. An intrusive object 40 may be an object that the computing device 10 has determined should not be in the scene and will proceed to remove. In some instances, the processor 20 may be configured to detect the intrusive object 40 based on a comparison with objects identified in images stored in a gallery 42 in the memory 24 or in remote storage 44 of a user of the computing device 10. The remote storage 44 may be accessed via network 45. For example, the user may have a gallery 42 of personal images stored in their smartphone, and the processor 20 may execute an object detection algorithm such as a neural network to first detect objects in the stored images. For objects that are recognized as human, or optionally, as another living being such as an animal pet, a corresponding face signature 46 may be generated based on a suitable algorithm (e.g., facial recognition for humans and a pet-specific algorithm for detecting pets, which may be eye, body, or face detection trained on pet images). In addition to the on-device gallery 42, the remote storage 44 may be analyzed similarly, including social media accounts logged in on the computing device 10. Once the face signatures 46 are generated, they may be stored for future use and updated periodically. The face signatures 46 may be ranked based on numerous factors such as how frequently they appear, whether they appear in close proximity to the known face of the computing device 10 user, whether they are phone or social media contacts with the user, etc.

In addition or in the alternative to facial recognition, the user's relation to objects recognized using object recognition algorithms could be ascertained and added to the rankings, which then is used to compute the probability that an object that appears in the scene is an intrusive object 40 rather than an object that the user desires to include within a captured image. Examples of such objects include vehicles, robots, and drones, for example. In this way, vehicles, robots, or drones that the user owns and is frequently captured in images with could be determined not to be intrusive, whereas other vehicles, robots, and drones would be classified as intrusive objects and subsequently removed from images.

In order to differentiate intrusive objects 40 from objects that belong in the scene, images of the secondary image sequence 18 may be processed similarly to generate face signatures 46 of any detected humans (or similar signatures for detected pets, or inanimate objects). The face signatures 46 in the secondary image sequence 18 may be compared to the known face signatures 46 to determine whether the currently depicted objects are intrusive and therefore should be removed, or known acquaintances that belong in the scene and should not be removed. In some cases, the processor 20 may be configured to use context 48 of the scene to detect the intrusive object 40. For example, a detected object may be matched to a known and highly ranked face signature 46, such as the computing device 10 user's husband. However, the computing device 10 may determine that the scene being recorded is a video call in a work setting where the husband does not belong. In this case, the husband, despite being positively identified, would be considered an intrusive object 40 when appearing behind the user in the video call. In some cases, the computing device 10 may use a meeting attendee list as context 48 to more definitively determine who belongs in the video call and who is intrusive. The processor 20 may configured to detect the intrusive object 40 by detecting objects in the secondary image sequence 18, detecting a principal subject 50 from among the detected objects, and determining that one of the detected objects is the intrusive object 40 based on at least one of depth, distance from the principal subject 50, and pose. For example, the principal subject 50 may be the owner of the computing device 10, a highly ranked face signature 46, or a centrally located person in focus. An object may be more likely to be intrusive when located at a different depth than the principal subject 50, far away from the principal subject 50 or a group including the principal subject 50, or looking in a different direction or otherwise exhibiting body language indicating lack of inclusion in a group with the principal subject 50, to provide merely a few examples. It will be appreciated that other discernable pieces of context 48 may be used in suitable situations and numerous possibilities exist.

As shown in FIG. 2, the processor 20 may be configured to track the intrusive object 40 at F and segment the intrusive object 40 from the remainder of the secondary image sequence 18, so that the processor 20 can then remove the intrusive object 40 at C, which will be described in further detail with reference to FIG. 3. Then, the processor 20 may be configured to replace the intrusive object 40 in the primary image sequence 14 with corresponding background pixels of the reference frame 32 to generate a modified primary image sequence 114 at G. In more detail, the processor 20 may be configured to replace the intrusive object 40 by first determining a region of interest (ROI) 52A bounding the intrusive object 40 in an image of the secondary image sequence 18. Then, the processor may determine a corresponding ROI 52B in a corresponding image of the primary image sequence 14, and determine a corresponding ROI 52C in the reference frame 32. These ROIs 52A-C may be the result of object detection in each image. Finally, the processor 20 may inpaint pixels from the ROI 52C in the reference frame 32 to the ROI 52B in the image of the primary image sequence 14. Thus, after removing the intrusive object 40 from an image of the primary image sequence 14, the processor 20 is able to then fill the holes (the ROI 52B) with background pixels from the reference frame 32 to modify the image to show only the intended objects (here, the family of three) in front of a complete background.

Once the primary image sequence 14 is modified, the processor 20 may be configured to output on a display 54 at least one image 114A of the modified primary image sequence 114. The output image 114A may be displayed on the viewfinder or display 54 of the computing device 10 for the user to confirm before instructing the image 114A to be saved, and the entire modified primary image sequence 114 may be displayed so that the user can continue to make adjustments and instruct the subjects of the image in real time while seeing how the final image will look without the intrusive objects 40.

Figure 3:
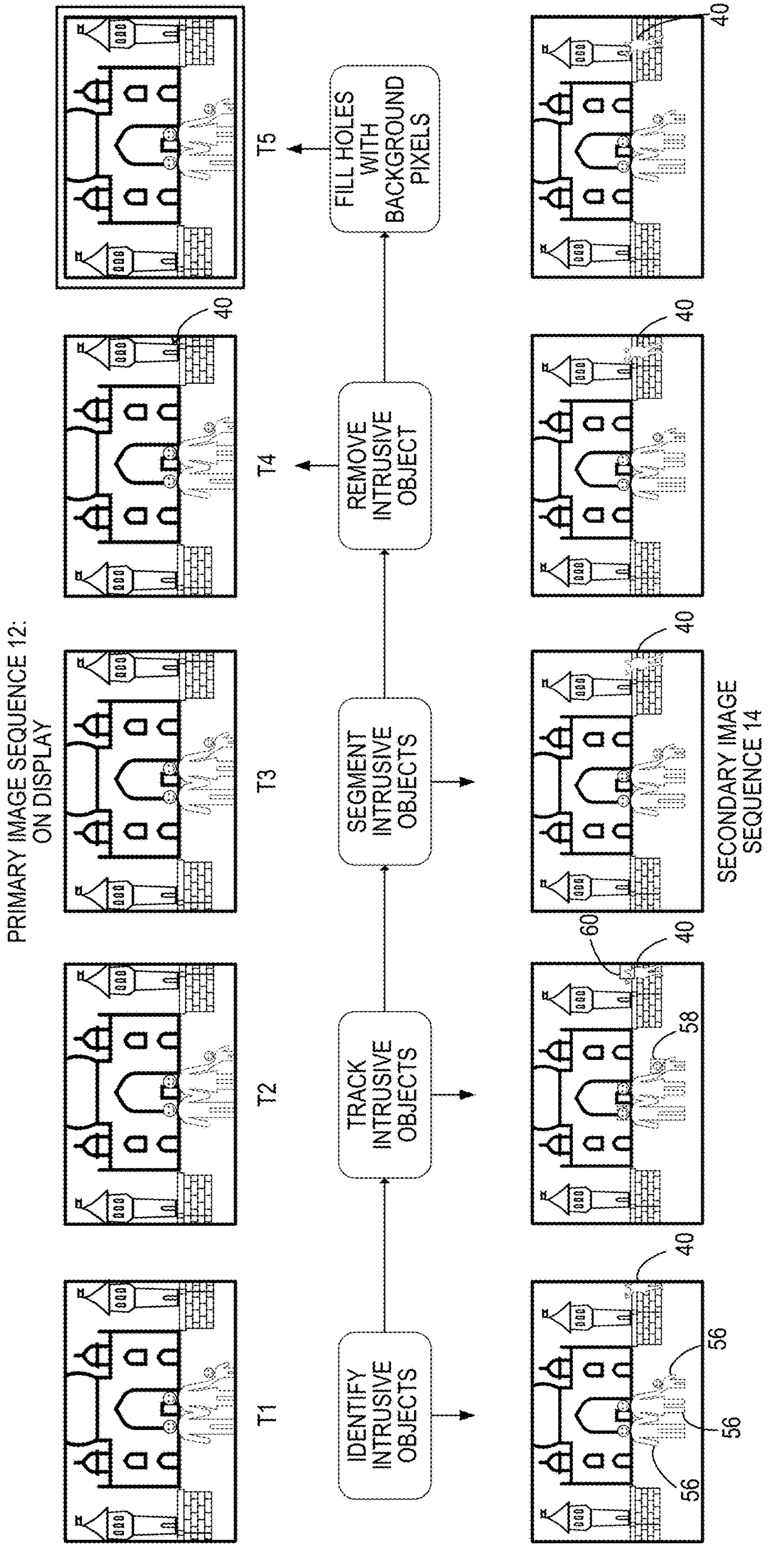
FIG. 3 shows an example illustration of tracking the intrusive object outside of the field of view of a first camera.

An example timeline of the primary image sequence 14 and secondary image sequence 18 is shown in FIG. 3. Once either intrusive or intended objects 40, 56 are identified in the scene at T1, the objects may be tracked at T2. Here, the tracking is shown with two types of markers around faces, where a dashed box 58 indicates intended objects 56 and a solid box 60 indicates an intrusive object 40; however, the tracking may be either displayed to the user in the primary image sequence 14 or not displayed on the display 54. In some cases, when the second camera 16 has a wider field of view than the first camera 12, the processor 20 may be configured to detect the intrusive object 40 in a region of the secondary image sequence 18 that is outside of a field of view of the primary image sequence 14. The processor 20 may then track the intrusive object 40 in the secondary image sequence 18 as the intrusive object 40 moves into the field of view of the primary image sequence 14, which is shown very slightly at T3. At T3, the intrusive object 40 is segmented as in FIG. 2, and then the intrusive object 40 may be removed at T4, all while the intrusive object 40 is moving into the field of view of the primary image sequence 14. At T5, where the intrusive object 40 would be in full view of the primary image sequence 14 without modification, the holes from removing the intrusive object 40 have already been filled so that the user may view the displayed output while operating the computing device 10 to capture the desired shot. The processor 20 may be configured to output at least one image 114A of the modified primary image sequence 114 in real time with capture of the primary image sequence 14. In this manner, much of the detection and processing is already done ahead of time before the intrusive object 40 moves into the frame of the primary image sequence 14 so that lag is reduced. It will be appreciated that many of the time points T1-T5 may be compressed, for example, the intrusive object 40 may be removed and the holes may be filled with background pixels at the same time.

Figure 4A:
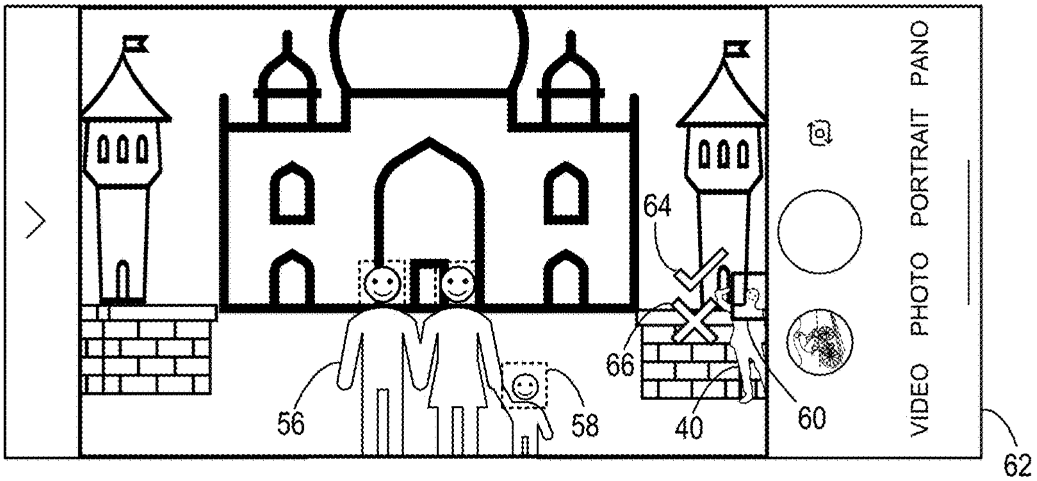
FIGS. 4A-4C show example graphical user interfaces (GUIs) of the computing device of FIG. 1.
Figure 4B:
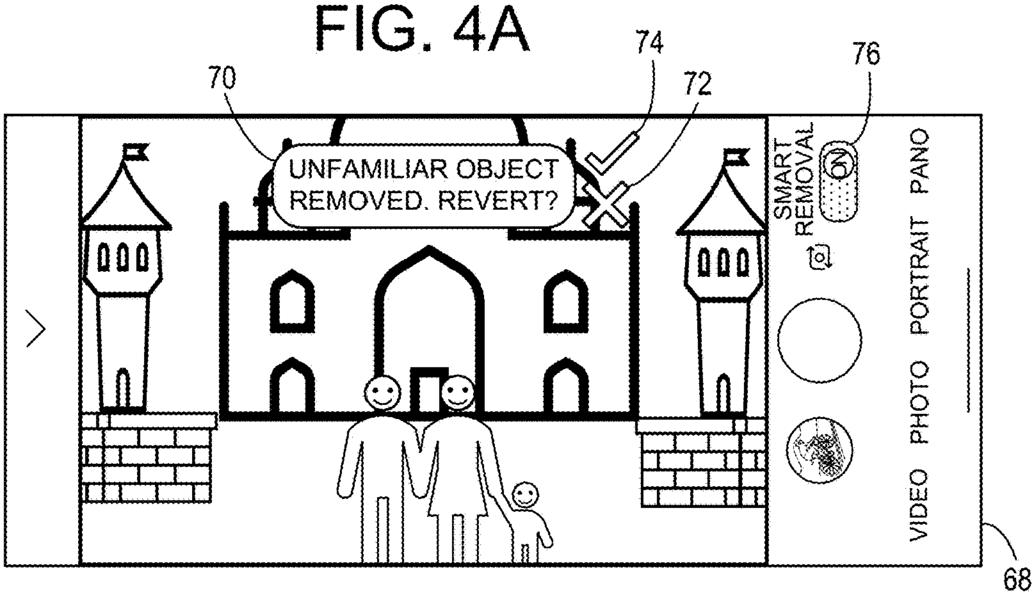
Figure 4C:
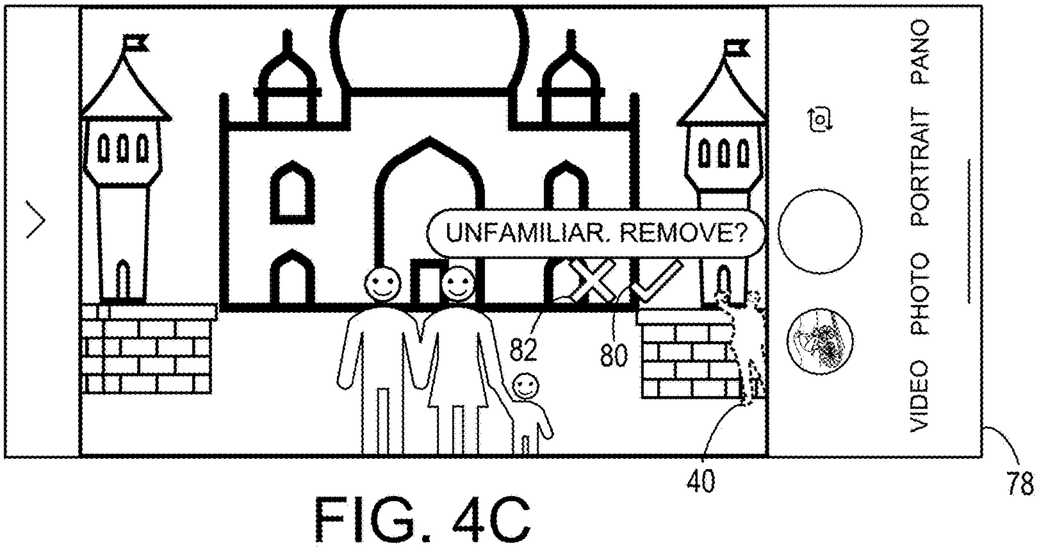

As shown in FIGS. 4A-C, in some cases, the computing device 10 may provide a graphical user interface (GUI) regarding removal of the intrusive object 40. The computing device 10 may even provide an option for the user to provide input regarding the removal. For example, in a GUI 62 shown in FIG. 4A, the primary image sequence 14 may be displayed with markers (e.g., boxes 60, 58) for intended objects 56 and intrusive objects 40. The GUI 62 may include an option 64 for the user to instruct removal and an option 66 for the user to instruct keeping the intrusive object 40. The computing device 10 may use the user input here to learn the user's preferences or improve the algorithms for determining which objects are intrusive. In a GUI 68 shown in FIG. 4B, the modified primary image sequence 114 may be displayed with a notice 70 that an intrusive object was removed, an option 72 to accept modifications, and an option 74 to revert to the original, unmodified primary image sequence 14. In any of these example GUIs, the intrusive object 40 removal may be an automated process that can be toggled on and off with a setting 76 by the user. In a GUI 78 shown in FIG. 4C, the intrusive object 40 may be outlined with an option 80 for the user to instruct removal and an option 82 for canceling of the modification. It will be appreciated that the illustrated GUIs are merely examples and any suitable conventional user input may be incorporated.

Figure 5:
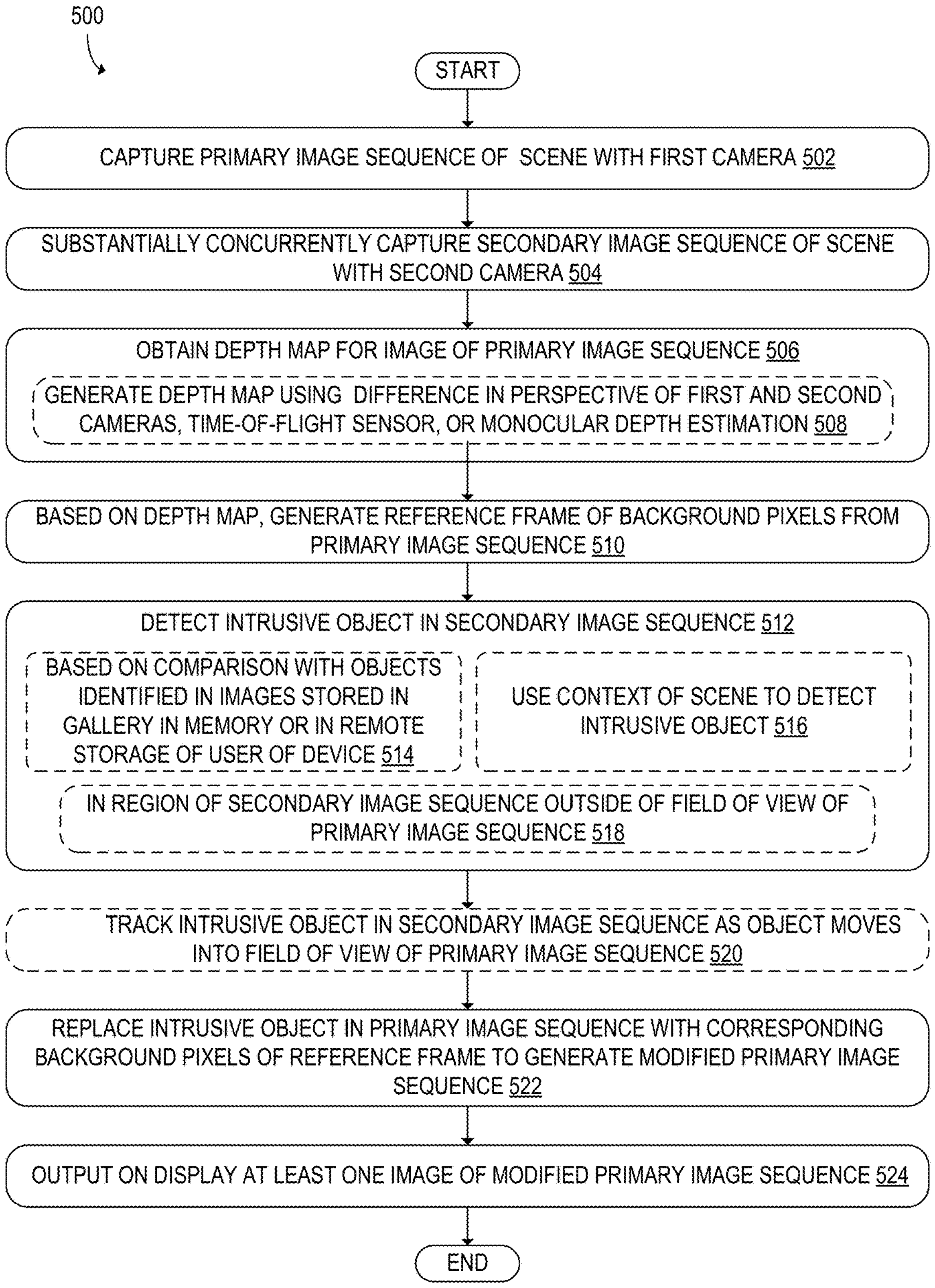
FIG. 5 shows a flowchart of an example method for removing intrusive objects from images, executed by the computing system of FIG. 1.

FIG. 5 shows a flowchart of a method 500 for removing intrusive objects from images. The following description of method 500 is provided with reference to the computing device 10 described above and shown in FIG. 1. It will be appreciated that method 500 may also be performed in other contexts using other suitable components.

With reference to FIG. 5, at 502, the method 500 may include capturing a primary image sequence of a scene with a first camera. At 504, the method 500 may include substantially concurrently capturing a secondary image sequence of the scene with a second camera. In some instances, the first camera may have a higher resolution than the second camera. In some instances, the second camera may have a wider field of view than the first camera. By including the two different cameras, the computing device may be able to process images captured by the second camera to detect objects before they enter the narrower field of view of the second camera, and under a reduced processing and storage burden compared to using the higher resolution images of the first camera.

At 506, the method 500 may include obtaining a depth map for an image of the primary image sequence. At 508, the method 500 may include generating the depth map using a difference in perspective of the first and second cameras, a time-of-flight sensor, or monocular depth estimation. The depth map may be saved in memory and updated as new images in the primary image series are captured, if the depth values in the scene change. At 510, the method 500 may include, based on the depth map, generating a reference frame of background pixels from the primary image sequence. The reference frame may include pixels from more than one captured frame in the primary image sequence as various objects move around in the scene, or as the computing device moves, revealing new portions of background over time. Like the depth map, the reference frame may be held in a buffer and updated over time so that an updated and relevant reference frame is available when needed.

At 512, the method 500 may include detecting an intrusive object in the secondary image sequence. The intrusive object may be distinguished from other recognized objects that are intentionally included in the scene by the user. For example, at 514, the detecting of the intrusive object may be based on a comparison with objects identified in images stored in a gallery in memory or in remote storage of a user of the computing device. Thus, the computing device may be able to determine that an object is intrusive because it is determined to be unfamiliar to the user. Alternatively or in addition, at 516, the method 500 may include using context of the scene to detect the intrusive object. Thus, even a familiar object may be determined to be inappropriate for the scene and therefore categorized as an intrusive object. In some examples, at 518, the method 500 may include detecting the intrusive object in a region of the secondary image sequence that is outside of a field of view of the primary image sequence, particularly when the field of view of the second camera is wider than the field of view of the first camera.

Figure 6:
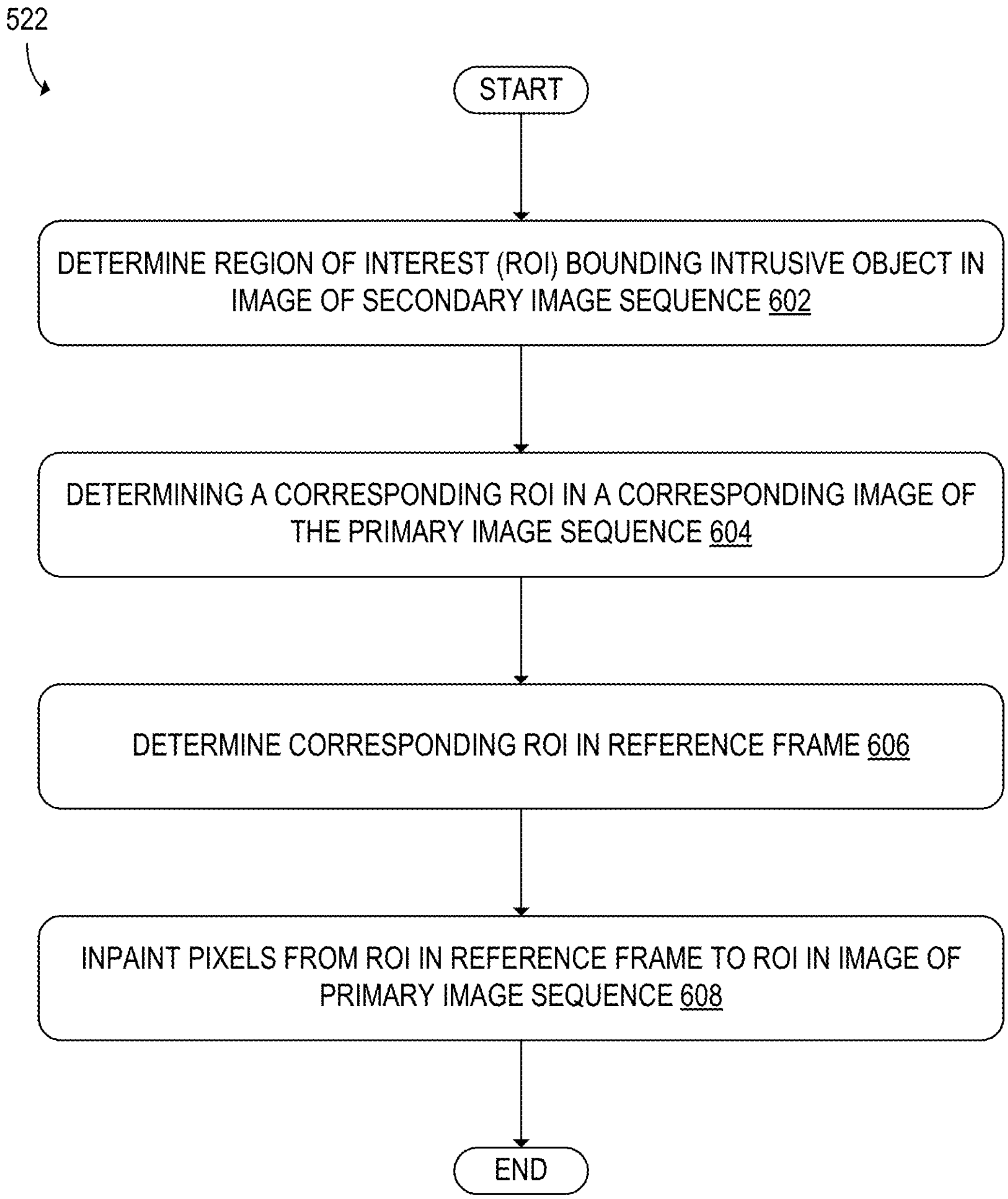
FIG. 6 shows a flowchart of an example series of substeps forming a step of the method of FIG. 5.

At 520, the method 500 may include tracking the intrusive object in the secondary image sequence as the intrusive object moves into the field of view of the primary image sequence. In this manner, the computing device may be able to perform all of the processing up front to be ready to remove the intrusive object from the final image captured by the first camera before the intrusive object enters the field of view of the first camera. At 522, the method 500 may include replacing the intrusive object in the primary image sequence with corresponding background pixels of the reference frame to generate a modified primary image sequence. Thus, a modified image sequence with the intrusive object removed as though it were never there, showing full, contiguous background, is generated. FIG. 6 shows example detailed steps of the replacing of the intrusive object at 522, including determining a region of interest (ROI) bounding the intrusive object in an image of the secondary image sequence at 602. At 604, the step 522 may include determining a corresponding ROI in a corresponding image of the primary image sequence. At 606, the step 522 may include determining a corresponding ROI in the reference frame. At 608, the step 522 may include inpainting pixels from the ROI in the reference frame to the ROI in the image of the primary image sequence.

Finally, returning to FIG. 5, at 524, the method 500 may include outputting on a display at least one image of the modified primary image sequence. The at least one image may be the final captured image that the user takes by tapping or pressing a button, etc., or the entire modified primary image sequence may be displayed as a preview for the user to make final adjustments before commanding the computing device to capture the final image to be saved in the user's gallery. That is, the at least one image of the modified primary image sequence may be output in real time with capture of the primary image sequence. The modified primary image sequence may also be a video file captured by the user, with the intrusive object replaced with corresponding background pixels. Furthermore, it will be appreciated that while removing one intrusive object is discussed in detail, numerous intrusive objects, stationary or mobile, may be removed from the same primary image sequence. For example, the family of three shown in FIGS. 2-4C may be at a tourist attraction on a busy day with a crowd of people between the family and a famous building. Due to the reference frame being built and updated as various objects move around, if the user waits for the reference frame to collect sufficient background pixels and all of the people eventually move even at different times or as new people come into view, the entire crowd could be removed from the primary image sequence.

The systems and methods disclosed above make it possible to automatically remove unwanted, unfamiliar, or inappropriate objects from images or video captured by a user in real time without requiring any user input or post-processing. This allows the user of a computing device to preview the modified image or video in order to make adjustments to the shot before final capture, or optionally provide feedback to the computing device regarding the determination of which objects are intrusive.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
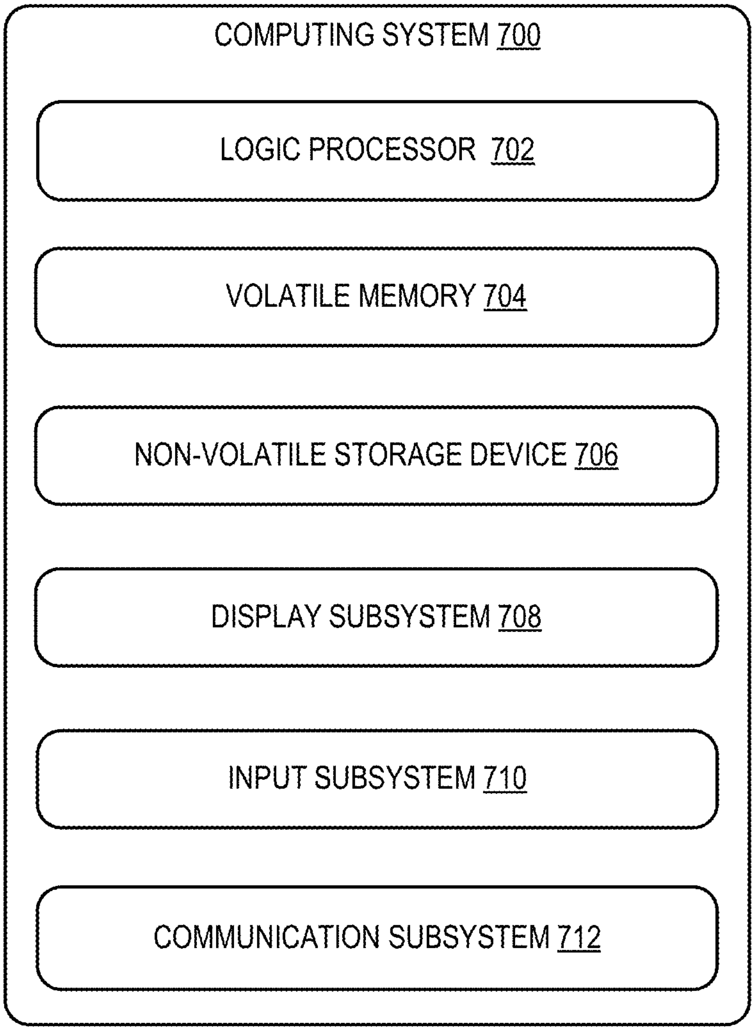
FIG. 7 shows a schematic view of an example computing environment in which the computing system of FIG. 1 may be enacted.
Figures 8A, 8B, 8C, 8D, 8E, 8F, 8G:
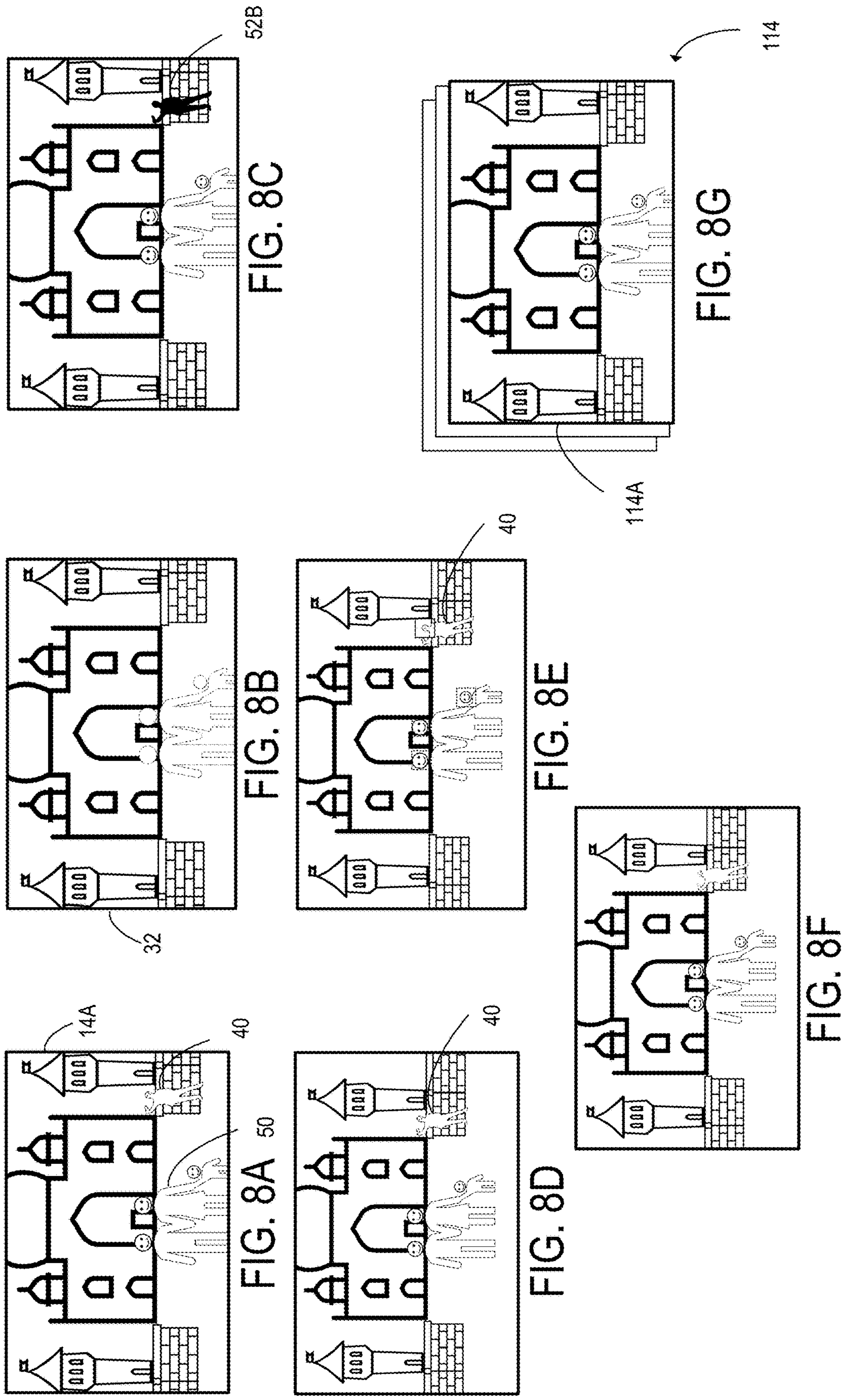
FIGS. 8A-8G illustrate items A-G of FIG. 1 in an enlarged manner.

FIG. 7 schematically shows a non-limiting embodiment of a computing system 700 that can enact one or more of the methods and processes described above. Computing system 700 is shown in simplified form. Computing system 700 may embody the computer device 10 described above and illustrated in FIG. 2. Computing system 700 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "instructions" and "module" may be used to describe an aspect of computing system 700 typically implemented in software by a processor to perform a particular function using portions of volatile memory, which function involves transformative processing that specially configures the processor to perform the function. Thus, logic processor 702 may execute instructions held by non-volatile storage device 706, using portions of volatile memory 704. It will be understood that different instructions and modules may be instantiated from the same application, service, code block, object, library, routine, API, function, etc. Likewise, the same instructions and modules may be instantiated by different applications, services, code blocks, objects, routines, APIs, functions, etc. The terms "instructions" and "module" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computing device, comprising a first camera configured to capture a primary image sequence of a scene, a second camera configured to substantially concurrently capture a secondary image sequence of the scene, and a processor configured to execute instructions stored in memory to obtain a depth map for an image of the primary image sequence, based on the depth map, generate a reference frame of background pixels from the primary image sequence, detect an intrusive object in the secondary image sequence, replace the intrusive object in the primary image sequence with corresponding background pixels of the reference frame to generate a modified primary image sequence, and output on a display at least one image of the modified primary image sequence. In this aspect, additionally or alternatively, the first camera may have a higher resolution than the second camera. In this aspect, additionally or alternatively, the second camera may have a wider field of view than the first camera. In this aspect, additionally or alternatively, the processor may be configured to output the at least one image of the modified primary image sequence in real time with capture of the primary image sequence. In this aspect, additionally or alternatively, the processor may be configured to detect the intrusive object based on a comparison with objects identified in images stored in a gallery in the memory or in remote storage of a user of the computing device. In this aspect, additionally or alternatively, the processor may be configured to use context of the scene to detect the intrusive object. In this aspect, additionally or alternatively, the processor may be configured to detect the intrusive object in a region of the secondary image sequence that is outside of a field of view of the primary image sequence, track the intrusive object in the secondary image sequence as the intrusive object moves into the field of view of the primary image sequence, and replace the intrusive object in the primary image sequence with the corresponding background pixels to generate the modified primary image sequence. In this aspect, additionally or alternatively, the processor may be configured to generate the depth map using a difference in perspective of the first and second cameras, a time-of-flight sensor, or monocular depth estimation. In this aspect, additionally or alternatively, the intrusive object may be a human or a non-human animal. In this aspect, additionally or alternatively, the processor may be configured to detect the intrusive object by detecting objects in the secondary image sequence, detecting a principal subject from among the detected objects, and determining that one of the detected objects is the intrusive object based on at least one of depth, distance from the principal subject, and pose. In this aspect, additionally or alternatively, the processor may be configured to replace the intrusive object by determining a region of interest (ROI) bounding the intrusive object in an image of the secondary image sequence, determining a corresponding ROI in a corresponding image of the primary image sequence, determining a corresponding ROI in the reference frame, and inpainting pixels from the ROI in the reference frame to the ROI in the image of the primary image sequence.

Another aspect provides a method for removing intrusive objects from images. The method may comprise capturing a primary image sequence of a scene with a first camera, substantially concurrently capturing a secondary image sequence of the scene with a second camera, obtaining a depth map for an image of the primary image sequence, based on the depth map, generating a reference frame of background pixels from the primary image sequence, detecting an intrusive object in the secondary image sequence, replacing the intrusive object in the primary image sequence with corresponding background pixels of the reference frame to generate a modified primary image sequence, and outputting on a display at least one image of the modified primary image sequence. In this aspect, additionally or alternatively, the first camera may have a higher resolution than the second camera, and the second camera may have a wider field of view than the first camera. In this aspect, additionally or alternatively, the at least one image of the modified primary image sequence may be output in real time with capture of the primary image sequence. In this aspect, additionally or alternatively, the detecting of the intrusive object is based on a comparison with objects identified in images stored in a gallery in memory or in remote storage of a user of the computing device. In this aspect, additionally or alternatively, the method may further comprise using context of the scene to detect the intrusive object. In this aspect, additionally or alternatively, the method may further comprise detecting the intrusive object in a region of the secondary image sequence that is outside of a field of view of the primary image sequence, tracking the intrusive object in the secondary image sequence as the intrusive object moves into the field of view of the primary image sequence, and replacing the intrusive object in the primary image sequence with the corresponding background pixels to generate the modified primary image sequence. In this aspect, additionally or alternatively, the method may further comprise generating the depth map using a difference in perspective of the first and second cameras, a time-of-flight sensor, or monocular depth estimation. In this aspect, additionally or alternatively, the replacing of the intrusive object may comprise determining a region of interest (ROI) bounding the intrusive object in an image of the secondary image sequence, determining a corresponding ROI in a corresponding image of the primary image sequence, determining a corresponding ROI in the reference frame, and inpainting pixels from the ROI in the reference frame to the ROI in the image of the primary image sequence.

Another aspect provides a computing device, comprising a first camera configured to capture a primary image sequence of a scene, a second camera having a wider field of view than the first camera, that is configured to substantially concurrently capture a secondary image sequence of the scene, and a processor configured to execute instructions stored in memory to obtain a depth map for an image of the primary image sequence, based on the depth map, generate a reference frame of background pixels from the primary image sequence, detect an intrusive object in the secondary image sequence, determine a region of interest (ROI) bounding the intrusive object in an image of the secondary image sequence, determine a corresponding ROI in a corresponding image of the primary image sequence, determine a corresponding ROI in the reference frame, inpaint pixels from the ROI in the reference frame to the ROI in the image of the primary image sequence to generate a modified primary image, and output on a display the modified primary image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
- a first camera configured to capture a primary image sequence of a scene;
- a second camera configured to substantially concurrently capture a secondary image sequence of the scene; and
- a processor configured to execute instructions stored in memory to:
  - generate a reference frame of background pixels from the primary image sequence;
  - detect objects in the secondary image sequence;
  - determine that one of the detected objects is an intrusive object based on at least one of pose and distance from a principal subject from among the detected objects;
  - replace the intrusive object in the primary image sequence with corresponding background pixels of the reference frame to generate a modified primary image sequence; and
  - output on a display at least one image of the modified primary image sequence.

2. The computing device of claim 1, wherein the first camera has a higher resolution than the second camera.

3. The computing device of claim 1, wherein the second camera has a wider field of view than the first camera.

4. The computing device of claim 1, wherein the processor is configured to output the at least one image of the modified primary image sequence in real time with capture of the primary image sequence.

5. The computing device of claim 1, wherein the processor is configured to detect the intrusive object based on a comparison with objects identified in images stored in a gallery in the memory or in remote storage of a user of the computing device.

6. The computing device of claim 1, wherein the processor is configured to use context of the scene to detect the intrusive object.

7. The computing device of claim 1, wherein the processor is configured to:

detect the intrusive object in a region of the secondary image sequence that is outside of a field of view of the primary image sequence;

track the intrusive object in the secondary image sequence as the intrusive object moves into the field of view of the primary image sequence; and replace the intrusive object in the primary image sequence with the corresponding background pixels to generate the modified primary image sequence.

8. The computing device of claim 1, wherein the processor is configured to generate the depth map using a difference in perspective of the first and second cameras, a time-of-flight sensor, or monocular depth estimation.

9. The computing device of claim 1, wherein the intrusive object is a human or a non-human animal, vehicle, drone, or robot.

10. The computing device of claim 1, wherein the processor is configured to receive user input selecting at least one of an option for the user to instruct removal of the intrusive object and an option for the user to instruct keeping the intrusive object.

11. The computing device of claim 1, wherein the processor is configured to replace the intrusive object by:

determining a region of interest (ROI) bounding the intrusive object in an image of the secondary image sequence;

determining a corresponding ROI in a corresponding image of the primary image sequence;

determining a corresponding ROI in the reference frame; and inpainting pixels from the ROI in the reference frame to the ROI in the image of the primary image sequence.

12. A method for removing intrusive objects from images, comprising:

capturing a primary image sequence of a scene with a first camera;

substantially concurrently capturing a secondary image sequence of the scene with a second camera;

generating a reference frame of background pixels from the primary image sequence;

detecting objects in the secondary image sequence;

determining that one of the detected objects is an intrusive object based on at least one of pose and distance from a principal subject from among the detected objects;

replacing the intrusive object in the primary image sequence with corresponding background pixels of the reference frame to generate a modified primary image sequence; and outputting on a display at least one image of the modified primary image sequence.

13. The method of claim 12, wherein the first camera has a higher resolution than the second camera, and the second camera has a wider field of view than the first camera.

14. The method of claim 12, wherein the at least one image of the modified primary image sequence is output in real time with capture of the primary image sequence.

15. The method of claim 12, wherein the detecting of the intrusive object is based on a comparison with objects identified in images stored in a gallery in memory or in remote storage of a user of the computing device.

16. The method of claim 12, further comprising using context of the scene to detect the intrusive object.

17. The method of claim 12, further comprising:

detecting the intrusive object in a region of the secondary image sequence that is outside of a field of view of the primary image sequence;

tracking the intrusive object in the secondary image sequence as the intrusive object moves into the field of view of the primary image sequence; and replacing the intrusive object in the primary image sequence with the corresponding background pixels to generate the modified primary image sequence.

18. The method of claim 12, further comprising generating the depth map using a difference in perspective of the first and second cameras, a time-of-flight sensor, or monocular depth estimation.

19. The method of claim 12, wherein the replacing of the intrusive object comprises:

determining a region of interest (ROI) bounding the intrusive object in an image of the secondary image sequence;

determining a corresponding ROI in a corresponding image of the primary image sequence;

determining a corresponding ROI in the reference frame; and inpainting pixels from the ROI in the reference frame to the ROI in the image of the primary image sequence.

20. A computing device, comprising:

a first camera configured to capture a primary image sequence of a scene;

a second camera having a wider field of view than the first camera, that is configured to substantially concurrently capture a secondary image sequence of the scene; and a processor configured to execute instructions stored in memory to:

generate a reference frame of background pixels from the primary image sequence;

detect objects in the secondary image sequence;

determine that one of the detected objects is an intrusive object based on at least one of pose and distance from a principal subject from among the detected objects;

determine a region of interest (ROI) bounding the intrusive object in an image of the secondary image sequence;

determine a corresponding ROI in a corresponding image of the primary image sequence;

determine a corresponding ROI in the reference frame;

inpaint pixels from the ROI in the reference frame to the ROI in the image of the primary image sequence to generate a modified primary image; and output on a display the modified primary image.

* * * * *